United States Patent [19]
Cameron et al.

[11] Patent Number: 6,107,840
[45] Date of Patent: Aug. 22, 2000

[54] METHOD AND APPARATUS FOR ELIMINATING ASYMMETRY ERROR IN SERVO DE-MODULATION USING PEAK-TO-PEAK DETECTION OF SERVO BURST AMPLITUDES

[75] Inventors: Scott Cameron, Woodland Park; Randall L. Sandusky, Divide; Gary Asakawa, Colorado Springs, all of Colo.

[73] Assignee: Texas Instruments Incorporated, Dallas, Tex.

[21] Appl. No.: 09/216,567

[22] Filed: Dec. 18, 1998

[51] Int. Cl.[7] .................................................. G01R 19/00
[52] U.S. Cl. ................................................ 327/62; 327/58
[58] Field of Search ................................ 327/58–62, 354, 327/91

[56] References Cited

U.S. PATENT DOCUMENTS

| | | | |
|---|---|---|---|
| 4,419,595 | 12/1983 | Reiner | 327/58 |
| 4,613,769 | 9/1986 | Gross et al. | 327/62 |
| 5,122,760 | 6/1992 | Nishijima . | |
| 5,684,651 | 11/1997 | Yaegashi et al. . | |
| 5,821,790 | 10/1998 | Sweetman | 327/62 |
| 5,828,240 | 10/1998 | Smith | 327/62 |

*Primary Examiner*—Toan Tran
*Attorney, Agent, or Firm*—W. Daniel Swayze, Jr.; W. James Brady, III; Frederick J. Telecky, Jr.

[57] ABSTRACT

A circuit to generate a servo burst signal, including a circuit to generate a first differential signal and a second differential signal, a first half wave rectifier to rectify the first differential signal and to generate a first rectified signal, a second half wave rectifier to rectify the second differential signal and to generate a second rectified signal, a first peak detector to detect a first peak of the first rectified signal, a second peak detector to detect a second peak of the second rectified signal, and a circuit to generate the servo burst signal based on the first peak signal and the second peak signal.

5 Claims, 5 Drawing Sheets

METHOD AND APPARATUS FOR ELIMINATING ASYMMETRY ERROR IN SERVO DE-MODULATION USING PEAK-TO-PEAK DETECTION OF SERVO BURST AMPLITUDES

FIELD OF THE INVENTION

The present invention relates to a magnetic disk system in which servo data representing track and sector positions on an magnetic disk is read out to perform positioning control for a magnetic head on the magnetic disk and more particularly to a magnetic disk system with a servo system having a asymmetric peak to peak detector.

BACKGROUND OF THE INVENTION

A magnetic disk is used as a storage medium for a magnetic disk system. The disk includes a plurality of tracks each having a predetermined width which are assigned in the radial direction of the magnetic disk as a recording area for various data. In each track, sectors are assigned at predetermined intervals in the circumferential direction of the track. In each sector and track, servo data representing the position of the track in sector is recorded.

This servo data is recorded on a magnetic disk as a flux reversal pattern obtained by a track or sector address expressed by a binary number to correspond to a change of data of a (1) or a (0). The magnetic disk system reads back the servo data through the magnetic head to perform positioning control of the magnetic head on the magnetic disk.

A conventional circuit for detecting the servo signal in such a magnetic disk system for performing the positional control for the magnetic head is shown in FIG. 15.

Servo data recorded on magnetic disk 1501 as a flux reversal pattern is read back by a magnetic head 1502. The detected servo data is output as an analog servo signal S1 and the servo signal S1 is supplied to an AGC (Automatic Gain Control) amplifier 1503. The AGC amplifier 1503 amplifies the analog servo signal S1 supplied from the magnetic head 1502 and adjusts the level of the servo signal S1 to a predetermined signal level. The servo signal S2 having a level adjusted by the AGC amplifier 1503 is supplied to a high frequency removal filter 1502.

The high frequency removal filter 1504 removes, based on a predetermined and fixed cut off frequency, a high-frequency noise component included in the servo signal S2 supplied from the magnetic head 1502 through the AGC amplifier 1503. A servo signal S3 from which the high frequency noise component is removed by the high frequency removal filter 1504 is supplied to a pulse decoder 1505 and a integral-type gain detector 1506.

The pulse detector 1505 detects in accordance with a predetermined qualification level TL, peak points corresponding to the flux reversal read portions of the servo signal S3 supplied through the high frequency removal filter 1504, and output each peak point as a binary pulse S4. The servo data recorded on the magnetic disk 1501 is recognized as a positioning address of the magnetic head 1502, representing a track, a sector or the like.

The level of the servo signal S3 from which a high frequency noise component is removed by the filter 1504 is detected by an integral-type gain detector 1506, and the servo signal S3 is feed back to the AGC amplifier 1503 as a gain control signal S5. The AGC amplifier 1503 adjusts an application gain for the servo signal S1 read from the magnetic head 1502 in response to the gain control signal S5. In this manner, a level of the servo signal S2 output to the filter 1504 is adjusted to a predetermined level.

Flux reversal patterns recorded on the magnetic disk 1 as servo data are generally recorded, in synchronism with the predetermined write frequency, at any position in the inner most and outer most tracks of the magnetic disk 1501 rotated at a predetermined speed. For this reason, the data recording density is low in the outermost track (OT) of the magnetic disk 1501 and high in the innermost tracks (ID).

The interval between the respective reversal portions of the servo data is large in the outermost tracks of the magnetic disks of 1501 and small in the innermost tracks. For this reason, when the servo data is read out by the magnetic head 1502, the leading and trailing edges of the signal waveform correspond to each flux reversal portion in the outermost tracks are different from those in the innermost tracks. In the outermost tracks, the leading and trailing edges of the signal waveform are sharp and approximate to those in an independent waveform. In the innermost tracks, the waveforms are interfered with each other to dull the total waveform.

Additionally, servo demodulation in disk drives which incorporate embedded servo sectors has traditionally been achieved by first rectifying the servo burst waveform and then performing either an area detection or peak detection on the rectified burst. However, the servo burst waveform may suffer from asymmetry. Asymmetry is when the amplitude of the positive pulses of the servo burst waveform is different from the amplitude of the negative pulses of the servo burst waveform. This may be caused by a MR lead. Thus, if the amplitude is determined based on a zero to peak of the signal, the amplitude will be different for the positive pulse with respect to the negative pulses. This is caused by a level shift in this case upwards along the vertical axis of the entire signal.

FIG. 3 illustrates an asymmetric waveform. If the asymmetric waveform is rectified, the rectified output is a series of pulses with alternating amplitudes which is illustrated in FIG. 4 as curve 400. As illustrated in FIG. 4, if peak detection is used on this rectified asymmetric signal, then the envelop that is output, shown as curve 404, corresponds to the larger of the two alternating amplitudes, which in turn introduces an error into any further calculations, since curve 404 does not take into account the smaller amplitudes.

One solution is illustrated by the curves of FIGS. 5,6 and 7. Here, the asymmetric waveform, curve 500, is separated into positive pulses 600 and negative pulses 700. The positive pulses 600 is peak detected to generate curve 602. The negative pulses 700 are inverted to peak detect curve 702. FIG. 6 illustrates the positive pulse to form the rectified curve 600 of the positive pulses. Curve 602 illustrates the peak detection of these positive pulses. In contrast, the inverted negative pulses are illustrated in FIG. 7 by curve 700 and are peak detected by curve 702. FIG. 9 illustrates on such circuit. As illustrated in FIG. 9, differential signals, signal DP and signal DN are input to a half wave rectifier 930. A differential amplifier 900 controls the output of differential amplifier 904 and the output of differential amplifier 902. More specifically, the output of each of differential amplifier 902 and differential amplifier 904 is controlled by switches which is controlled by differential amplifier 900. The output is sent to peak detecting circuit 920. This circuit 920 detects the peak of the positive peaks of differential signal DP or the peaks of the differential signal DN depending upon which switch is closed and which switch is open and being controlled by differential amplifier 900. However, the circuit shown in FIG. 9 does not eliminate the asymmetry associated with the input signal.

SUMMARY OF THE INVENTION

The present invention is to provide a circuit to eliminate the asymmetry associated with servo burst waveform.

The present invention includes a pair of half wave rectifiers, which, one rectifies positive pulses while the other half wave rectifies negative pulses. Additionally, the present invention includes a pair of peak detectors each directly connected to half wave rectifier to detect the peak from the output of the half wave rectifier of the positive pulses and to detect the peak of the half wave rectifier of the negative pulses. The output of peak detectors are summed with a summing circuit. Finally, the output of the summing circuit is selected by a multiplexer circuit to output a selected burst.

Additionally, the present invention uses a single differential amplifier to provide a single differential signal from the differential pair of signals mainly, differential signal DP and differential signal DN. The output of the single differential amplifier is connected to a peak detection circuit which includes a positive peak detention circuit as well as a negative peak detention circuit. The positive output of the positive peak detection circuit and the negative output of the negative peak detector circuit two outputs are connected to the input of a differential amplifier which is a summing circuit to sum the positive and negative peak signals. The signal output of the differential amplifier, summing circuit is input to the multiplexer circuit to select a burst signal. This aspect of the present invention both eliminates the effects of asymmetry eliminates a mismatch problem that may occur when the positive pulse and the negative pulse are ultimately recombined to form a single circuit.

DETAILED DESCRIPTION OF THE INVENTION

Figure 17:
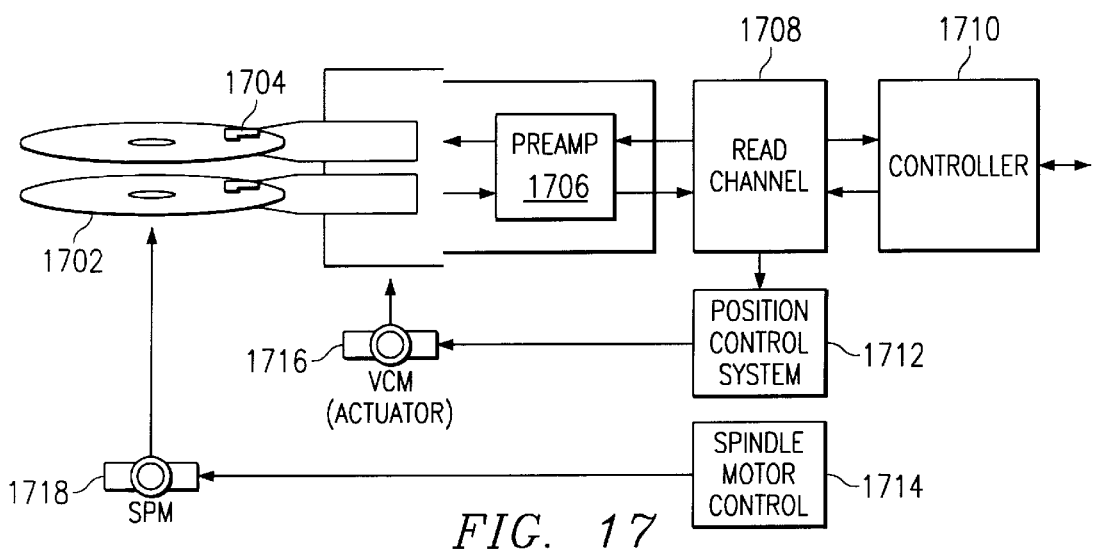
FIG. 17 illustrates a system of the present invention.

FIG. 17 illustrates a disk system of the present invention. Magnetic transitions are stored on the surface of disk 1702. These transitions are read by heads 1704 and transformed into electrical pulses. The electrical pulses are transmitted from the head 1704 to the preamplifier 1706 were they are amplified by the preamplifier 1706. The amplified electrical pulses are transmitted to a read channel 1708 which includes a AGC circuit. The read channel 1708 obtains timing and positional information which are transmitted to the position control systems 1712. The position control 1712 includes the servo demodulation circuit of the present invention. The position control system 1712 controls the voice coil motor 1716 which moves the head in and out along the surface of the disk 1702. In addition, a spindle motor control circuit 1714 controls a spindle motor 1718 which rotates the disk 1720 at a high rate of speed.

Figure 1:
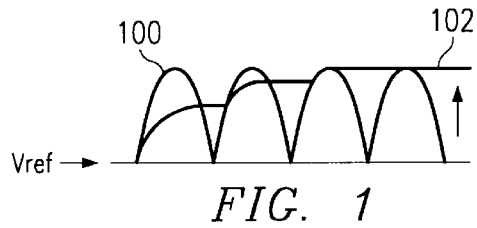
FIG. 1 illustrates a rectified waveform the symmetrical signal.
Figure 2:
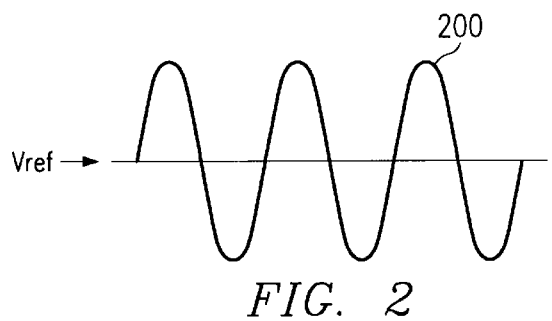
FIG. 2 illustrates the symmetrical signal.
Figure 3:
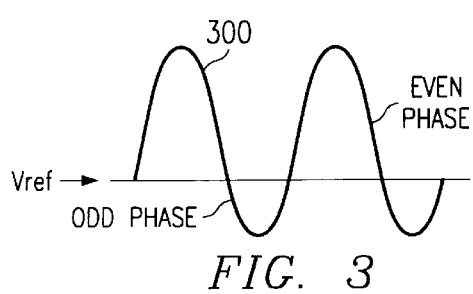
FIG. 3 illustrates a asymmetric signal.
Figure 4:
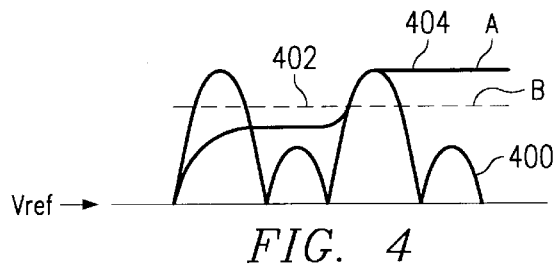
FIG. 4 illustrates the asymmetrical signal which has been rectified and peak detected.
Figure 5:
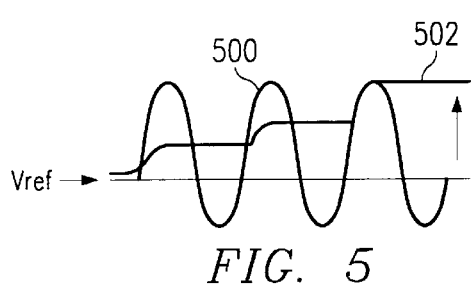
FIG. 5 illustrates another asymmetric signal.
Figure 6:
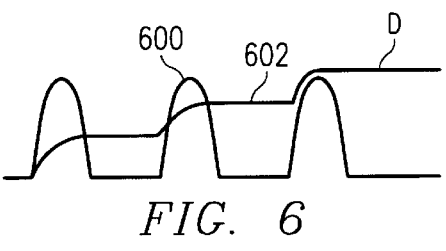
FIG. 6 illustrates peak detect of the positive pulses of the asymmetric signal.
Figure 7:
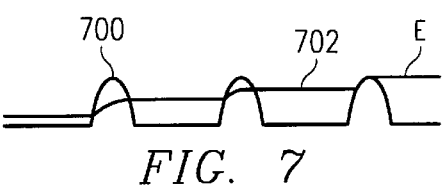
FIG. 7 illustrates peak detect of the negative pulses of the asymmetric signal.
Figure 8:
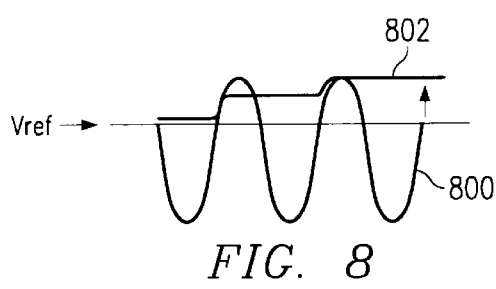
FIG. 8 illustrates a waveform diagram.
Figure 9:
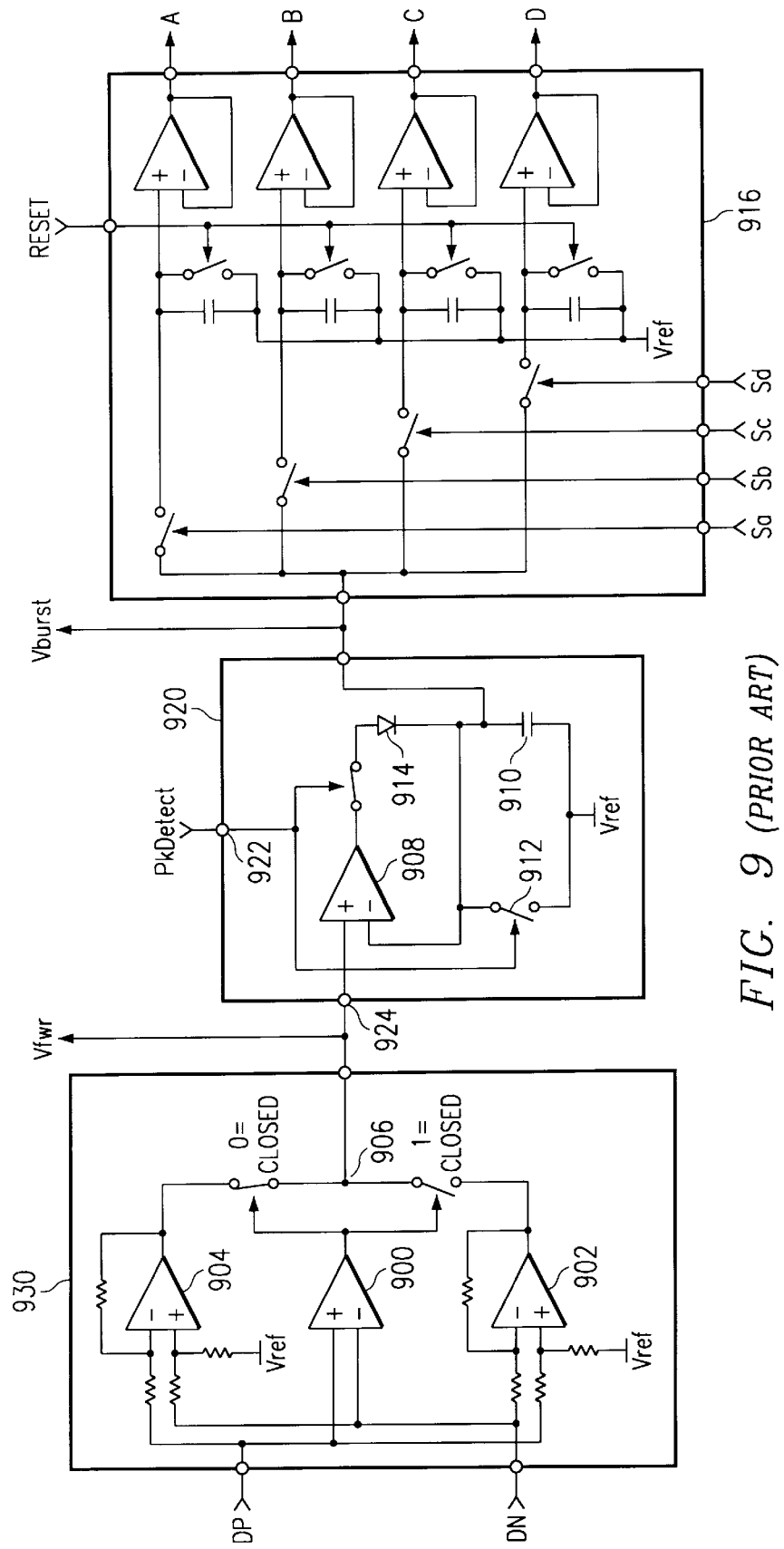
FIG. 9 illustrates a servo demodulation circuit.
Figure 10:
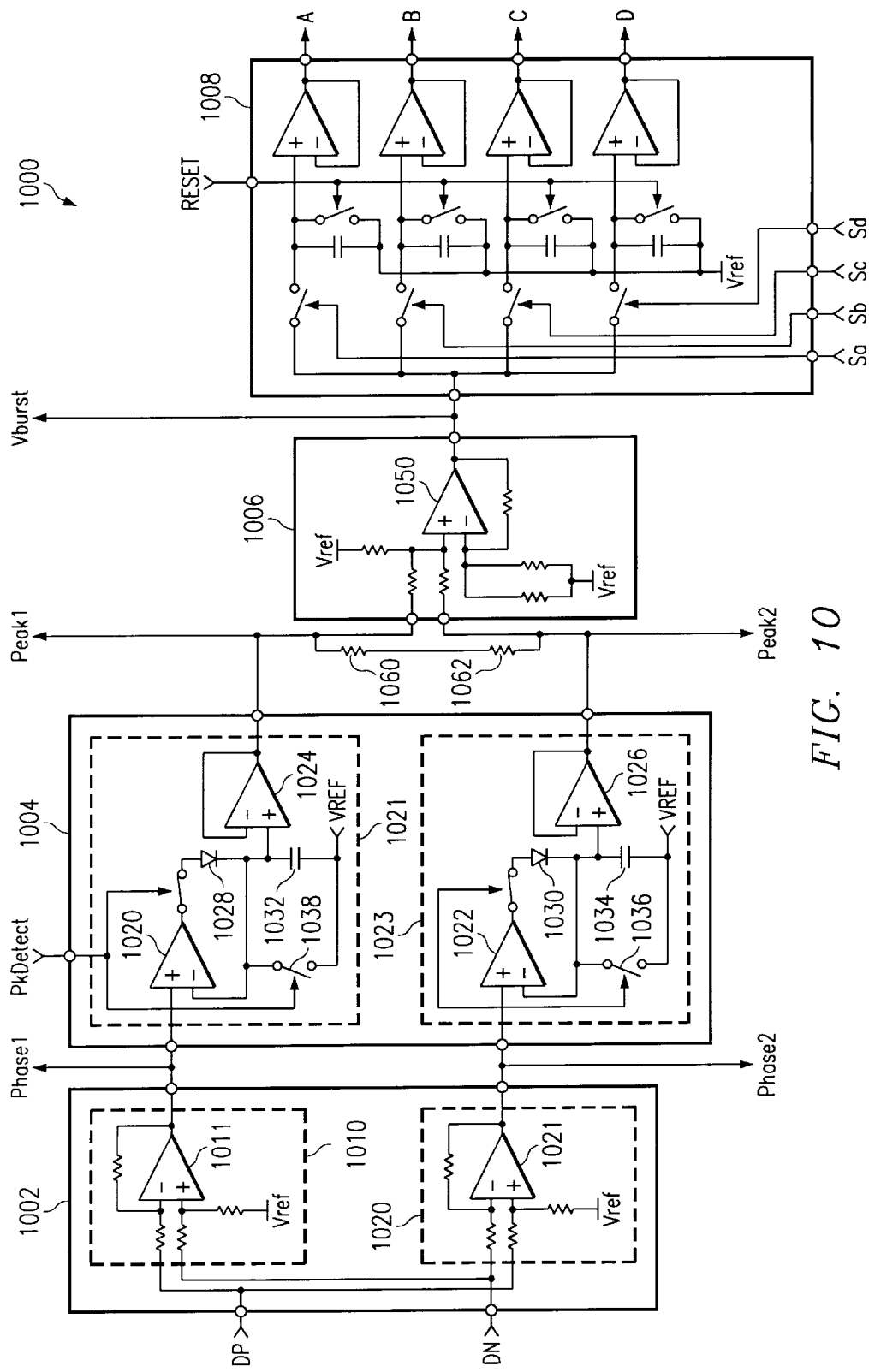
FIG. 10 illustrates a servo demodulation circuit of the present invention.

FIG. 10 illustrates a servo demodulator circuit 1000 of the present invention. The servo demodulator circuit 1000 includes a full wave rectifier 1002 which rectifies the differential signal DP and the differential signal DN, a peak detecting circuit 1004 to determine the peak of the rectified signal, a summing circuit 1006 to sum the peak signals and a multiplexer circuit 1008. The full wave rectifying circuit 1002 includes a half wave positive rectifying circuit 1010 which includes a differential amplifier 1011 with one input to receive the differential signal DP and the output of the differential amplifier 1011 while the other input is set at the differential signal DN biased by the voltage $V_{ref}$. The positive half wave rectifying circuit 1010 outputs a positive rectified signal which is the positive pulses of signal DP to peak detector circuit 1004, more specifically the positive peak detector circuit 1021. Likewise, the full wave rectifier 1002 includes a half wave negative rectifying circuit 1020 which rectifies the differential signal DN. The half wave rectifying circuit 1020 includes a differential amplifier 1021 which accepts the differential signal DN and the output of differential amplifier 1021 in one input while the other input is set at the differential signal DP biased by the voltage $V_{ref}$. The negative half wave rectifying circuit 1020 outputs a negative rectified signal which is based on the negative pulse of DN. A positive peak detector circuit 1021 receives the positive rectified signal from the positive half wave rectifier 1010. The positive peak detector circuit 1021 includes a differential amplifier 1020 to compare the voltage on capacitor 1032 with the positive rectified signal output from the positive rectifying circuit 1010. Thus, when the positive rectified signal exceeds the voltage across capacitor 1032, the differential amplifier 1020 outputs a positive signal indicative of the voltage of the capacitor 1032. This positive signal is transmitted through diode 1028 and raises the voltage across capacitor 1032. Differential amplifier 1024 is used as a buffer and amplifies this positive capacitor voltage across the capacitor 1032 and outputs a positive peak signal to the summing circuit 1006.

The negative peak detect circuit 1023 operates in a similar fashion. A differential amplifier 1022 amplifies a difference between the voltage of capacitor 1034 and the negative rectified signal being input to differential amplifier 1022. When the negative rectified signal is greater than the voltage across capacitor 1034, the differential amplifier 1022 outputs a second positive differential amplifier signal through diode 1030, and this second positive signal charges capacitor 1034. A differential amplifier 1026 acts a buffer and amplifies the signal from capacitor 1034 and outputs a negative peak signal to the summing circuit 1006. The summing circuit 1006 sums positive peak signal and the negative peak signal to form a composite burst signal. A pair of resistors 1060 and 1062 are commonly connected to each other and the resistor 1060 is connected to the output of the positive peak detector circuit 1021, and the resistor 1062 is connected to the output of the negative peak circuit 1023. Both the outputs of the negative peak detector 1023 and the positive peak detector 1021 are connected through resistors to differential amplifier 1050. The output of the differential amplifier 1050 is input to the mulitplexer circuit 1008. The output of the summing circuit 1006 is the burst signal. The circuit 1000 eliminates the asymmetry associated with the input signal however, because of the separate signal paths through the half wave rectifies (1010,1021) and the peak detector (1021,1023) circuit 1000 may have a problem with mismatch when the signals are rejoined at the summing circuit 1006.

In operation as illustrated by FIG. 10, the two differential signals, DP and DP, are input to the positive rectifying circuit 1010 and the negative rectifying circuit 1020. The positive rectified signal is output from the positive rectifying circuit 1010 and a negative rectified signal is output from the negative rectifying circuit 1020. The positive rectified signal is input to differential amplifier 1020 while the negative rectified signal is input to differential amplifier 1022. When the positive rectified signal is greater than the voltage on capacitor 1032, the differential amplifier 1020 outputs a positive signal which is conducted through diode 1028 to charge capacitor 1032. Likewise, a negative rectified signal is output from negative rectifying circuit 1020 and input to differential amplifier 1022. If the negative rectified signal is greater than the voltage on capacitor 1034, a signal is output from differential amplifier 1022 through diode 1030 to charge capacitor 1034. Differential amplifier 1024 buffers the voltage on capacitor 1032 to output a positive peak signal indicating the voltage across capacitor 1032. Likewise, the differential amplifier 1026 outputs a negative peak signal based upon the voltage across capacitor 1034.

The positive peak signal and the negative peak signal are summed by summing circuit 1006 to output a burst signal.

Figure 11:
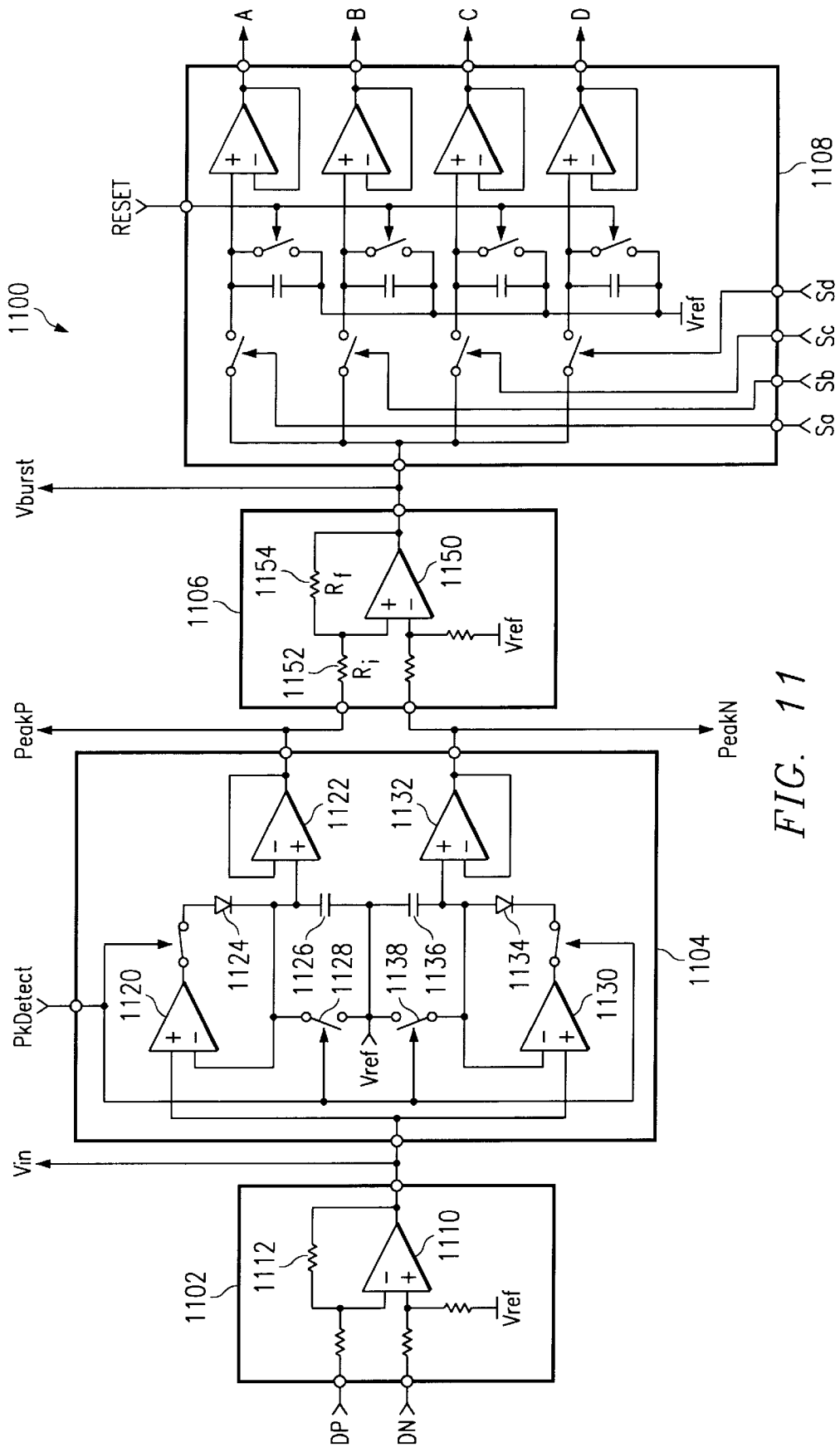
FIG. 11 illustrates another servo demodulation circuit of the present invention.
Figure 12:
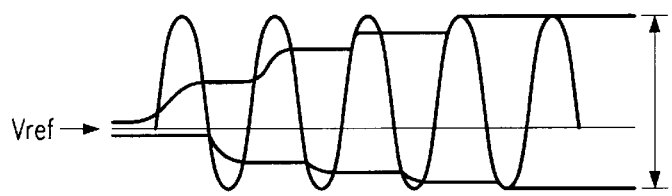
FIG. 12 illustrates an asymmetric signal with both the positive pulses and the negative pulses being peak detected.
Figure 13:
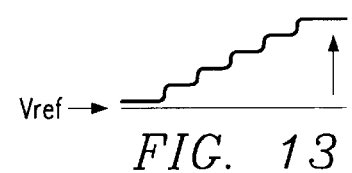
FIG. 13 illustrates a waveform of FIG. 12.
Figure 14:
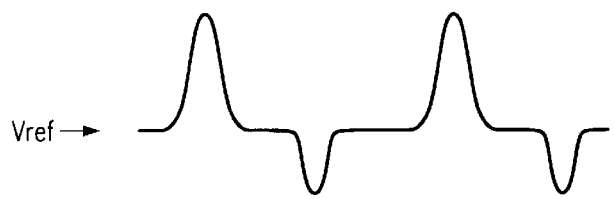
FIG. 14 illustrates a waveform from a M R head.
Figure 16:
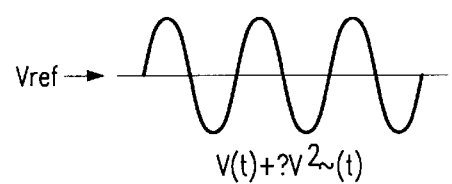
FIG. 16 illustrates a waveform diagram.
Figure 15:
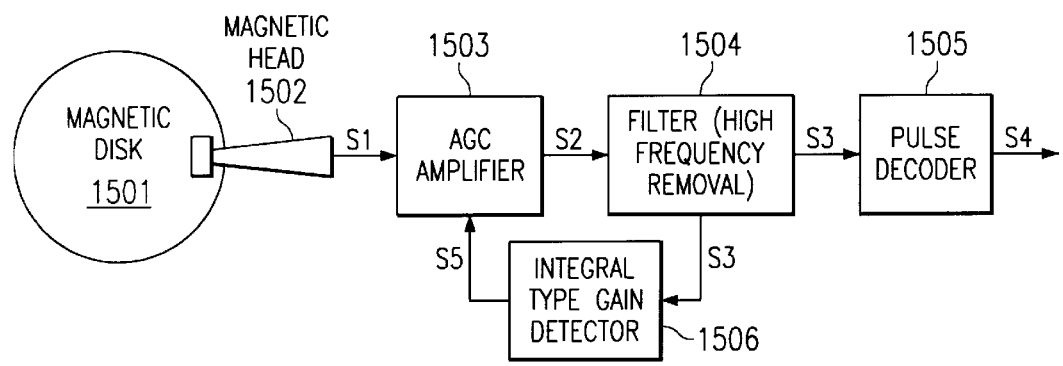
FIG. 15 illustrates AGC circuit.

Turning to FIG. 11, this figure illustrates a servo demodulation circuit 1100. FIG. 11 illustrates a difference circuit 1102 which outputs a difference signal which is input to peak detecting circuit 1104. The peak detecting circuit 1104 outputs a peak signal to summing circuit 1106. The output of summing circuit 1106 is burst signal, which is input to multiplexer circuit 1108.

The difference circuit 1102 includes a differential amplifier 1110. Additionally, the differential amplifier 1110 includes a resistor 1112 connected between the output of differential amplifier 1110 and the input of the differential amplifier 1110. Differential signal DP is input to the differential amplifier 1110 and differential signal DN is input to the differential amplifier 1110. The output from the differential amplifier 1110 is a difference signal DP−DN. The difference signal is input to the differential amplifier 1120 and the differential amplifier 1130. A reset signal (PK detect) controls switch 1128 and switch 1138 to clear or short the voltage from capacitors 1126 and 1136, respectively. After the reset signal has been received, the reset signal ends and switches 1128 and 1138 are opened to allow a voltage to be stored on capacitors 1126 and 1136. A diode 1124 is connected between the output of differential amplifier 1120 and the capacitor 1126. Additionally, the output of diode 1124 is connected to the input of the differential amplifier 1120. Furthermore, the capacitor 1126 is connected to the output of diode 1124 and the input of differential amplifier 1120. A voltage $V_{ref}$ is connected to capacitor 1126 and capacitor 1136. Likewise, the output of diode 1134 is connected to differential amplifier 1130. The input of differential amplifier 1130 is connected to the input of the diode 1134. Additionally, the capacitor 1136 is connected to the input of differential amplifier 1130 and the input to the diode 1134. A differential amplifier 1122 acts a buffer to buffer the output of the capacitor 1126 an output of diode 1124. Additionally, the input to differential amplifier 1122 is connected to the output of differential amplifier 1122. Input to the peak detector circuit 1104 is the difference signal $V_{IN}$. This signal $V_{IN}$ corresponds to $D_P-D_N$. In operation, when the input signal VIN rises above the output of the differential amplifier 1120, the output of differential amplifier 1120 will increase this output in the form of a voltage which will cause a current to flow through diode 1124 and charge capacitor 1126. This process of charging the capacitor 1126 continues until the peak of the difference signal VIN is reached. At which time, the input to the differential amplifier 1120 no longer increases with respect to the output of the differential amplifier 1120, and consequently the capacitor 1126 no longer charges. As the voltage on the other input of the differential amplifier 1120 is larger in a negative sense, then the current does not flow to capacitor 1126 since the diode 1124 prevents the current from flowing through the diode 1124.

FIG. 11 illustrates that the peak detection circuit 1104 additionally includes differential amplifier 1130. An input of the differential amplifier 1130 receives the difference signal $V_{IN}$. Additionally, the input of the differential amplifier 1130 is connected to the input of the diode 1134 and the capacitor 1136. The output of differential amplifier 1130 is connected to the output of diode 1134. The differential amplifier 1132 which acts as a buffer has an input connected to the input of differential amplifier 1130, the input of diode 1134 and the capacitor 1136. The output of the differential amplifier 1132 is connected to the input of the differential amplifier 1132. The capacitor 1136 is connected to the reference voltage and the capacitor 1136.

In operation, when the difference signal $V_{IN}$, is greater than output of differential amplifier 1130, than the output of differential amplifier 1130 is positive voltage. However, diode 1134 prevents the capacitor 1136 from being charged from this positive voltage. However, if the difference signal $V_{IN}$, is less than the output of the differential amplifier 1130, than the output of the differential amplifier 1130 is negative, for example, a negative voltage. This negative voltage causes diode 1134 to conduct a current from the capacitor 1136 to diode 1134. The voltage rises on capacitor 1136 until the difference signal $V_{IN}$ does not increase, and, the capacitor 1136 captures the negative peak signal. The differential amplifier 1132 outputs this voltage to the output of differential amplifier 1132. The output of differential amplifier 1122 is a positive peak signal while the output of differential amplifier 1132 is a negative peak signal. The summing circuit 1106 includes the differential amplifier 1106. The positive peak signal is input to differential amplifier 1150. Additionally, the negative peak signal is input to the differential amplifier 1150. The negative peak signal is biased by the reference voltage $V_{ref}$. The output of differential amplifier 1150 is the burst signal. A resistor $R_F$ 1154 is connected between the output of differential amplifier 1150 and the input of the differential amplifier 1150. Additionally, resistors Ri are connected to both inputs of the differential amplifier 1150. $R_F$ divided by $R_{IR}$ is equal to a half. The burst signal is input to multiplexer circuit 1108.

What is claimed is:

1. A circuit to generate a servo burst signal, comprising:
   a circuit to generate a first differential signal and a second differential signal;
   a first half wave rectifier to rectify said first differential signal and to generate a first rectified signal;

a second half wave rectifier to rectify said second differential signal and to generate a second rectified signal;

a first peak detector to detect a first peak of said first rectified signal;

a second peak detector to detect a second peak of said second rectified signal;

a circuit to generate said servo burst signal based on said first peak signal and said second peak signal.

2. A circuit to generate a servo burst signal as in claim 1, wherein said first half wave rectifier includes a differential amplifier.

3. A circuit to generate a servo burst signal as in claim 1, wherein said second half wave rectifier includes a differential amplifier.

4. A circuit to generate a servo burst signal as in claim 1, wherein said first peak detector includes a differential amplifier.

5. A circuit to generate a servo burst signal as in claim 1, wherein said second peak detector includes a differential amplifier.

* * * * *